April 30, 1940.  V. L. SMITHERS  2,198,845
SEPARATOR FOR STORAGE BATTERIES
Filed Feb. 2, 1939
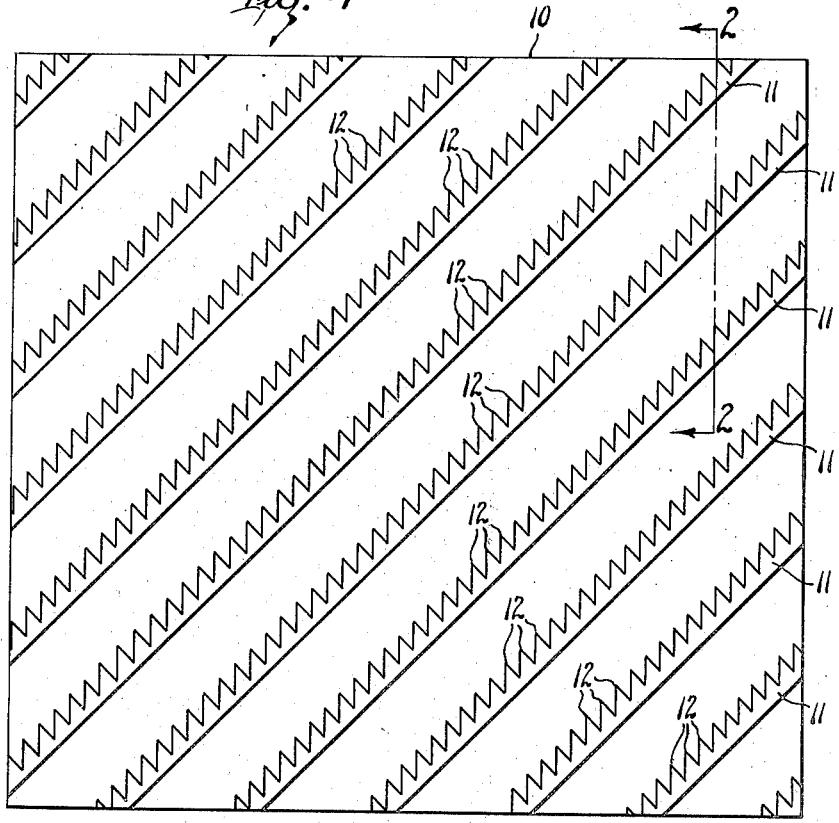
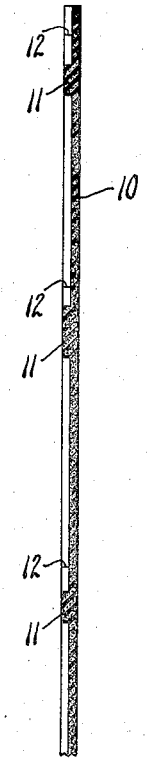
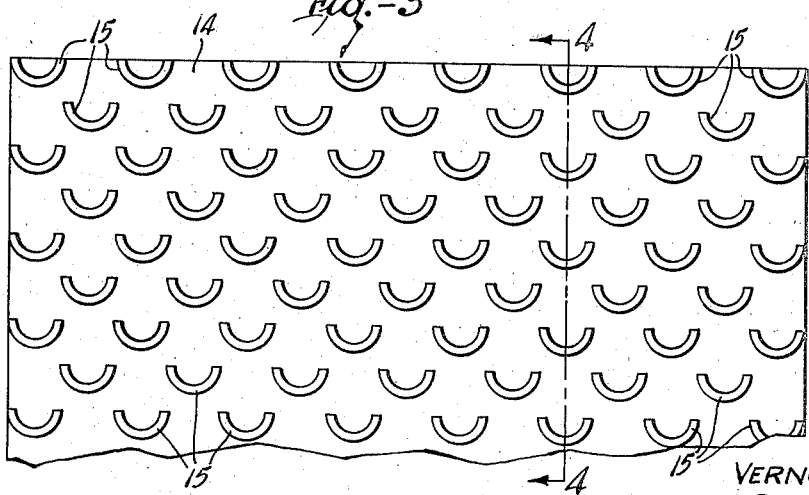
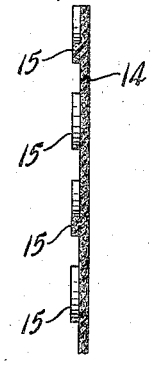
INVENTOR
VERNON L. SMITHERS
BY Ely & Frye
ATTORNEYS Patented Apr. 30, 1940

2,198,845

UNITED STATES PATENT OFFICE 2,198,845

SEPARATOR FOR STORAGE BATTERIES

Vernon L. Smithers, Akron, Ohio

Application February 2, 1939, Serial No. 254,190

4 Claims. (Cl. 136—143)

This invention relates to separators for storage batteries, and more especially it relates to pervious plates such as commonly are mounted between the positive and negative plates of storage batteries.

Such plates usually have ribs or lugs on one face thereof, which face bears against the positive plates of the battery, the ribs or lugs being so arranged as to enable vertical movement or circulation of the electrolyte and such oxygen as is evolved at the surface of the positive plate. Such ribs or lugs also are so arranged that active material which flakes off or is shed from the positive plates settles readily to the bottom of the battery cell, where it accumulates in a sediment zone provided thereat. It frequently happens that the sediment zone becomes filled with the flaked-off material, which, by coming into contact with the bottom margins of positive and negative plates, short circuits the battery and rapidly shortens the life thereof. If this condition is remedied by deepening the sediment zone, the battery plates will necessarily be reduced in area, thus reducing the amperage of the battery.

The chief object of this invention is to prevent active material that flakes off the battery plates from falling to the bottom of the battery cell and accumulating therein. More specifically the invention aims to provide an improved separator plate that will catch and retain said active material so that the same will not accumulate in the bottom of the battery cell. Further objects include the elimination or reduction in size of the sediment zone in the bottom of the battery cell, with permissible increase in the size of the plates, thus effecting improved performance of the battery. Other objects will be manifest as the specification proceeds.

Of the accompanying drawing:

Figure 1 is an elevation of a separator plate embodying the invention, showing the projections thereon that engage the positive plate of a battery when in service therein;

Figure 2 is a section, on a larger scale, on the line 2—2 of Fig. 1;

Figure 3 is a fragmentary elevation of another embodiment of the invention; and

Figure 4 is a section, on a larger scale, on the line 4—4 of Fig. 3.

Referring to Figs. 1 and 2 of the drawing, there is shown an improved separator plate 10 that is composed of pervious sheet material, which material may be soft wood, or it may be moldable material such as micro-porous rubber composition, or other similar material not affected by battery electrolyte. The plate 10 usually is rectangular in profile, and preferably is a relatively thin sheet to conserve space within the battery cell. That face of the plate 10 that abuts a positive plate or electrode of a battery is provided with a plurality of obliquely disposed spacer ribs 11, 11, and the upwardly presented lateral margins of said ribs are deeply serrated as shown at 12, 12. When the separator is made of moldable material, the ribs 11 may be molded integral with the remainder of the structure. It is within the purview of the invention however, to make the ribs as separate elements and attach them to the plate in any suitable manner.

When the improved separators are in use in a battery, the smooth faces thereof lie against the negative plates thereof and the serrated ribs 11 are flush against the positive plates and thus hold the sheet 10 in spaced relation thereto. Circulation of the electrolyte in the battery and the rise of gas bubbles proceeds along the oblique channels defined by adjacent ribs 11. Active material on the positive battery plates, as it disintegrates, flakes off, and falls, lodges in the indentures of the serrated upper margins of the ribs 11 and thereby is prevented from moving to the bottom of the cell. This condition obtains at least until said indentures are completely filled and may continue for some time thereafter if the battery is in use in a place that is not subject to jars and jolts. The accumulation of sediment in the indentures of the ribs 11 will not materially decrease the capacity of the flow-channels between adjacent ribs for the reason that flaking off of the active material results in a thinning of the positive plates and thus increases the distance between the latter and the separators.

The invention eliminates to a large extent the accumulation of sediment in the bottom of battery cells and consequent possibility of short-circuiting. Thus the sediment zone in the bottom of the cells may be greatly reduced in size, and the area of the battery plates correspondingly increased with resultant increase in the amperage of the battery.

In Figs. 3 and 4 of the drawing is shown another embodiment of the invention consisting of a pervious body or plate 14 that is provided on one face with a multiplicity of discontinuous, projecting elements 15, 15. Said elements 15 are in the form of short ribs that are of arcuate contour, the concave side of each element being uppermost. The elements 15 are symmetrically arranged in rows, and laterally spaced apart from each other a distance equal to the width of one element, the elements in each row being offset from or in staggered relation to the elements of the adjacent rows. The elements 15 are so arranged that when the separators are in use in a battery, the said elements being in contact with the positive plates of the battery, there are provided uninterrupted oblique passages for the circulation of electrolyte, and devious vertical passages for the same purpose. Since this separator provides no uninterrupted vertical passages, all active material that flakes off the positive plates will be intercepted by an element 15 before reaching the bottom of the cell. Since the said elements are concave on their top sides, they will catch and retain a substantial amount of the sediment. The advantages arising from the employment of this embodiment of the invention are the same as those enumerated with relation to the first described embodiment.

But two specific embodiments of the invention have been shown and described, it being understood that these are for illustrative purpose only, and that the invention may be embodied in other constructions without departing from the spirit of the invention or the scope thereof as defined by the appended claims. Thus the spacer elements may be disposed substantially at any angle, and may be continuous or discontinuous as desired, so long as they are positioned to catch and retain all, or a substantial portion, of the active material shed from the positive plates, and yet provide channels that extend from a lower level to a higher level so the circulation of the battery electrolyte is not prevented.

What is claimed is:

1. In a separator for storage battery plates, the combination of a sheet of porous material, and spacer elements projecting from a face thereof, said spacer elements consisting of obliquely disposed ribs that have serrated upper margins adapted to retain sediment in the indentures thereof.

2. In a separator for storage battery plates, the combination of a sheet of pervious material, and a multiplicity of discontinuous arcuate ribs projecting from a face thereof, the concave side of said ribs being uppermost.

3. A separator for storage battery plates, said separator comprising a pervious sheet of material and spacer elements projecting from a face thereof, said spacer elements consisting of obliquely disposed ribs, the upwardly presented margins of said ribs being formed with a plurality of spaced-apart upstanding elements adapted to retain on the sloped upper marginal faces of the ribs a substantial portion of the active material shed from a positive plate of the battery.

4. A separator for storage battery plates, said separator comprising a sheet of pervious material and spacer elements projecting from a face thereof, said spacer elements consisting of ribs arranged to define fluid channels extending from a lower level to a higher level of the sheet, each rib having at least one of its margins that confronts a fluid channel formed with a plurality of spaced apart elements that project from the rib and are adapted to intercept and retain a substantial portion of the active material shed from a positive plate of the battery.

VERNON L. SMITHERS.